United States Patent
Tanaka (10) Patent No.: US 9,832,824 B2
(45) Date of Patent: Nov. 28, 2017

(54) SEMICONDUCTOR DEVICE

(71) Applicant: Renesas Electronics Corporation, Tokyo (JP)

(72) Inventor: Noriyuki Tanaka, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/271,513

(22) Filed: Sep. 21, 2016

(65) Prior Publication Data
US 2017/0094735 A1    Mar. 30, 2017

(30) Foreign Application Priority Data

Sep. 28, 2015  (JP) ................................. 2015-189654

(51) Int. Cl.
| | |
|---|---|
| *H05B 37/02* | (2006.01) |
| *H05B 33/08* | (2006.01) |
| *B60Q 1/14* | (2006.01) |
| *H02M 3/156* | (2006.01) |

(52) U.S. Cl.
CPC ....... *H05B 33/0815* (2013.01); *B60Q 1/1407* (2013.01); *H02M 3/156* (2013.01)

(58) Field of Classification Search
CPC ............ H05B 33/0803; H05B 33/0806; H05B 33/0815; H05B 33/0833; H05B 33/0839; B60C 1/14; B60C 1/1407
USPC ..... 315/76–77, 80, 82, 84, 209 R, 291, 294, 315/297, 307
See application file for complete search history.

(56) References Cited

U.S. PATENT DOCUMENTS

| | | | |
|---|---|---|---|
| 2006/0043911 A1* | 3/2006 | Shao ................... | H05B 33/0815 315/291 |
| 2010/0156324 A1* | 6/2010 | Nagase ................ | H05B 33/089 315/307 |
| 2011/0074292 A1* | 3/2011 | Maehara ............ | H05B 33/0815 315/32 |
| 2012/0326632 A1* | 12/2012 | Kitagawa ........... | H05B 33/0824 315/307 |
| 2013/0127353 A1* | 5/2013 | Athalye ............. | H05B 33/0815 315/193 |
| 2014/0252950 A1* | 9/2014 | Kikuchi ............. | H05B 33/0815 315/77 |

(Continued)

FOREIGN PATENT DOCUMENTS

JP    2013-126338 A    6/2013

*Primary Examiner* — Jason M Crawford
(74) *Attorney, Agent, or Firm* — Mattingly & Malur, PC (57) ABSTRACT

There was a problem that it was difficult for a semiconductor device in the related art to increase the switching frequency of a step-up circuit, and it was difficult to stabilize an output current and an output voltage. A semiconductor device controls a step-up circuit including an inductor and a drive transistor to drive the inductor. The semiconductor device calculates upper and lower limits which determine the variable range of an input current, based on an output current and an input voltage, controls the switch timing of the drive transistor based on the relation between the upper and lower limits and the magnitude of the input current, and at the same time, corrects the upper and lower limits to be calculated, based on the magnitude of the difference between the output current and a target output current value as an ideal value of the output current.

10 Claims, 9 Drawing Sheets

(56) References Cited

U.S. PATENT DOCUMENTS

| | | | |
|---|---|---|---|
| 2014/0265890 A1* | 9/2014 | Ito | B60Q 1/00 |
| | | | 315/186 |
| 2014/0354158 A1* | 12/2014 | Hiramatsu | H05B 33/0815 |
| | | | 315/123 |
| 2015/0015143 A1* | 1/2015 | Inada | H05B 33/0815 |
| | | | 315/77 |
| 2015/0091468 A1* | 4/2015 | Naruo | H05B 33/0815 |
| | | | 315/291 |

* cited by examiner

TABLE ILLUSTRATING AMOUNT OF CORRECTION OF CALCULATED DRIVE CHANGE SETTING VALUE

| UPDATING CYCLE | CORRECTION AT STEP S13 | CORRECTION AT STEP S5 |
|---|---|---|
| 1ST CYCLE | CORRECT WITH AMOUNT OF CORRECTION a | CORRECT FOR ONE STEP OF DAC OUTPUT |
| 2ND CYCLE | CORRECT WITH AMOUNT OF CORRECTION a | CORRECT FOR ONE STEP OF DAC OUTPUT |
| 3RD CYCLE | CORRECT WITH AMOUNT OF CORRECTION a | CORRECT FOR ONE STEP OF DAC OUTPUT |
| 4TH CYCLE | CORRECT WITH AMOUNT OF CORRECTION a×1/2 | CORRECT FOR ONE STEP OF DAC OUTPUT |
| 5TH CYCLE | CORRECT WITH AMOUNT OF CORRECTION a×1/2 | CORRECT FOR ONE STEP OF DAC OUTPUT |
| 6TH CYCLE | CORRECT WITH AMOUNT OF CORRECTION a×1/4 | CORRECT FOR ONE STEP OF DAC OUTPUT |
| 7TH CYCLE | CORRECT WITH AMOUNT OF CORRECTION a×1/4 | CORRECT FOR ONE STEP OF DAC OUTPUT |
| 8TH CYCLE | CORRECT FOR ONE STEP OF DAC OUTPUT | CORRECT FOR ONE STEP OF DAC OUTPUT |

\# AMOUNT OF CORRECTION a = CORRECTION INSTRUCTION VALUE

SEMICONDUCTOR DEVICE

CROSS-REFERENCE TO RELATED APPLICATIONS

The disclosure of Japanese Patent Application No. 2015-189654 filed on Sep. 28, 2015 including the specification, drawings and abstract is incorporated herein by reference in its entirety.

BACKGROUND

The present invention relates to a semiconductor device, for example, to a semiconductor device which controls a drive transistor of a DC voltage conversion circuit according to the magnitude of an output current.

A DC voltage conversion circuit which converts an input DC voltage into an output DC voltage having a different voltage from the input DC voltage is employed in various circuits. The DC voltage conversion circuit includes a step-down circuit which steps down an input DC voltage and a step-up circuit which steps up the input DC voltage. An example of the step-down circuit is disclosed by Patent Literature 1.

A semiconductor device disclosed by Patent Literature 1 is comprised of a controller which outputs a control signal, and a power supply unit which has a switching element ON/OFF-controlled by the control signal and which generates an output current or an output voltage corresponding to an electric current flowing through the switching element. The controller is comprised of a CPU which outputs reference voltage information; a reference voltage generator which stores the reference voltage information and generates a reference voltage based on the stored information; a comparator which compares a comparison voltage corresponding to an output current or an output voltage generated by the power supply unit, with the reference voltage; and a control signal generator which generates a control signal of a logical value corresponding to the comparison result of the comparator. According to such a configuration, the semiconductor device disclosed by Patent Literature 1 can change the output current or the output voltage promptly to a target value.

(Patent Literature 1) Japanese Unexamined Patent Application Publication No. 2013-126338

SUMMARY

Although the semiconductor device disclosed by Patent Literature 1 is a step-down circuit, even if a similar configuration is applied to a step-up circuit, it is necessary to perform the PI control which requires an integration calculation, in order to ensure the reaching time to a target voltage and the followability to an input voltage variation. Since the PI control requires complicated calculations, the problem is that it is difficult to increase the switching frequency of a switching element (for example, a drive transistor) and that it is difficult to stabilize the output current and the output voltage.

The other issues and new features of the present invention will become clear from the description of the present specification and the accompanying drawings.

According to one embodiment, a semiconductor device controls a step-up circuit including an inductor and a drive transistor to drive the inductor. The semiconductor device calculates upper and lower limits which determine the variable range of an input current, based on an output current and an input voltage, controls the switch timing of the drive transistor based on the relation between the upper and lower limits and the magnitude of the input current, and at the same time, corrects the upper and lower limits to be calculated, based on the magnitude of the difference between the output current and a target output current value as an ideal value of the output current.

According to the one embodiment, the semiconductor device can stabilize the output current and the output voltage of the step-up circuit.

DETAILED DESCRIPTION

In the following description and drawings, abbreviation and simplification are properly made in order to clarify the explanation. Each element described in a drawing as a functional block which performs various kinds of processing can be configured hardware-wise with a CPU, a memory, and other circuits, and can be realized software-wise by a program loaded to a memory. Accordingly, the person skilled in the art can naturally understand that these functional blocks can be realized by hardware alone, software alone, or the combination of them, not restricted to one of them. In each drawing, the same symbol is attached to the same element and the repeated explanation thereof will be omitted if necessary.

The program described above can be stored using various types of non-transitory computer readable media, and can be supplied to a computer. The non-transitory computer readable media include various types of tangible storage media. The example of the non-transitory computer readable medium includes magnetic recording media (for example, a flexible disk, a magnetic tape, and a hard disk drive), optical magnetic recording media (for example, a magneto-optical disk), a CD-ROM (Read Only Memory), a CD-R, a CD-R/W, and a semiconductor memory (for example, a mask ROM, a PROM (a programmable ROM), an EPROM (an erasable PROM), a flash ROM, and an RAM (Random Access Memory)). The program may be supplied to a computer by various types of transitory computer readable media. The example of the transitory computer readable media includes an electrical signal, a light signal, and electromagnetic waves. The transitory computer readable media can supply a program to a computer via a wired communication path such as an electric wire and an optical fiber, or a wireless communication path.

Embodiment 1

Figure 1:
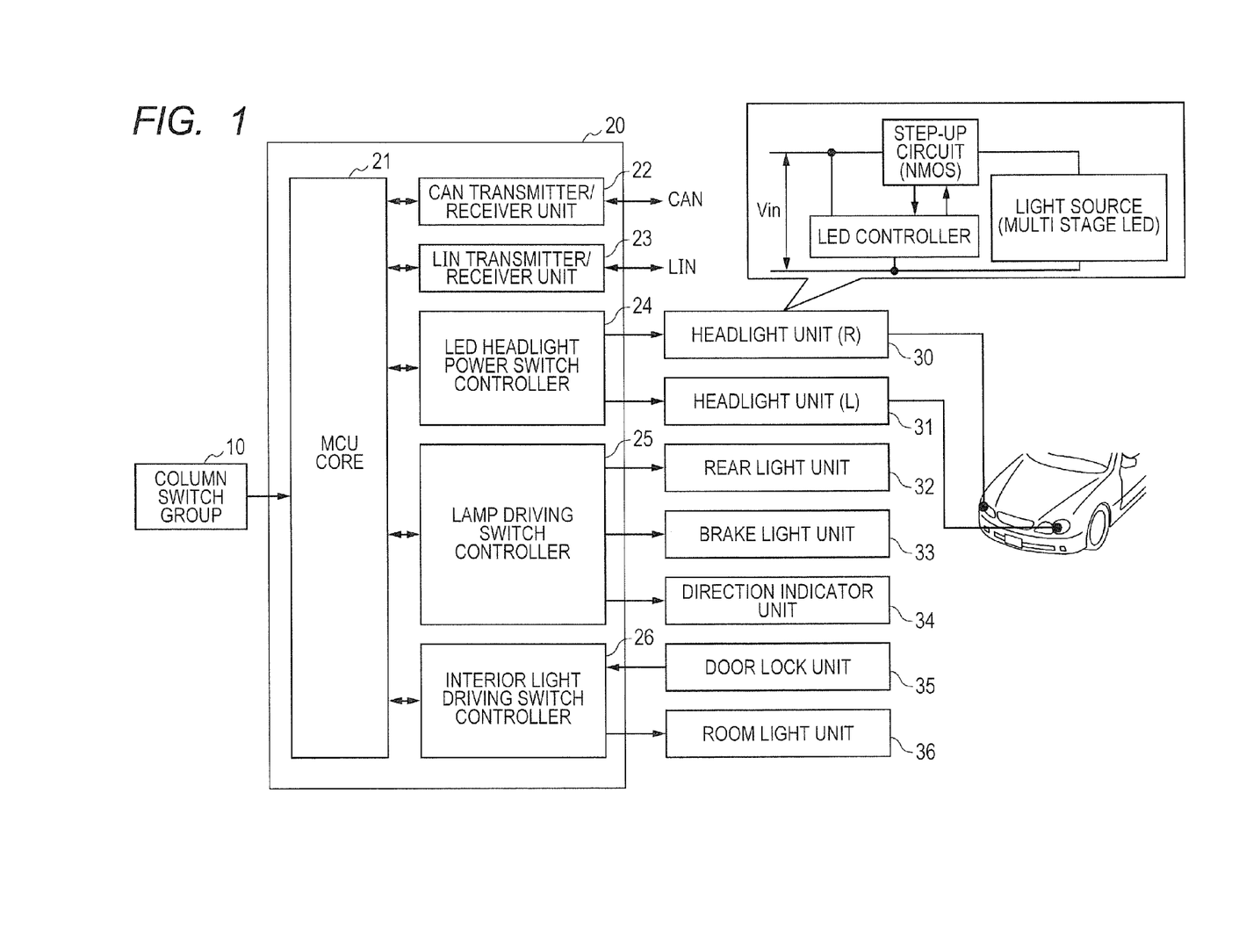
FIG. 1 illustrates a block diagram of an in-vehicle system including a semiconductor device according to Embodiment 1.

First, a semiconductor device 1 according to Embodiment 1 controls a step-up circuit. The step-up circuit outputs an output DC voltage obtained by stepping up an input DC voltage, and supplies the output DC voltage outputted to a load. The following explanation will be made about an example in which an LED (Light Emitting Diode) light source is applied as a load. However, a circuit which can be used as a load is not restricted to the LED light source. This LED light source is employed for a headlight of a vehicle, for example. FIG. 1 illustrates a block diagram of an in-vehicle system including the semiconductor device 1 according to Embodiment 1.

As illustrated in FIG. 1, the in-vehicle system including the semiconductor device 1 according to Embodiment 1 is a light source control system which controls a light source provided in a vehicle for example. The light source control system is comprised of a column switch group 10, a main MCU 20, headlight units 30 and 31, a rear light unit 32, a brake light unit 33, a direction indicator unit 34, a door lock unit 35, and a room light unit 36.

The main MCU 20 includes a MCU core 21 and multiple peripheral circuits. In the example illustrated in FIG. 1, the main MCU 20 is comprised of the multiple peripheral circuits such as a CAN transmitter/receiver unit 22, an LIN transmitter/receiver unit 23, an LED headlight power switch controller 24, a lamp driving switch controller 25, and an interior light driving switch controller 26.

The column switch group 10 is a switch group provided in a steering column, and supplies an instruction of turning on/off of various kinds of lights by the operation of a driver. In response to the instruction of turning on/off of a light from the column switch group 10, the main MCU 20 supplies the instruction of turning on/off to the light. When the main MCU 20 receives an instruction of turning on/off of a light from other devices such as a door mounted in a vehicle, the main MCU 20 supplies the instruction of turning on/off to the light, as is the case where an instruction is received from the column switch group 10.

Here, an example of operation of the in-vehicle system illustrated in FIG. 1 is explained. When an instruction to turn on a headlight is received from the column switch group 10, the MCU core 21 outputs to the LED headlight power switch controller 24 an instruction to turn on the headlight units 30 and 31. In response to the instruction from the MCU core 21, the LED headlight power switch controller 24 outputs an instruction to turn on a switch in the headlight units 30 and 31 and starts supply of an electric power from the battery to the headlight units 30 and 31. The headlight unit 30 and the headlight unit 31 turn on an LED light source responding to the start of the supply of the electric power.

Furthermore, when the MCU core 21 receives the instruction to turn on the headlight from the column switch group 10, the MCU core 21 outputs to the lamp driving switch controller 25 an instruction to turn on the rear light unit 32 which should be turned on in a manner interlocked with the headlight. The lamp driving switch controller 25 outputs an instruction to turn on the switch in the rear light unit 32, and starts supply of the electric power from the battery to the rear light unit 32. The rear light unit 32 turns on an LED light source responding to the start of the supply of the electric power.

When the MCU core 21 is notified that a brake has been stepped on via a CAN (Controller Area Network) or an LIN (Local Interconnect Network), the MCU core 21 outputs to the lamp driving switch controller 25 an instruction to turn on the brake light unit 33. The lamp driving switch controller 25 outputs an instruction to turn on a switch in the brake light unit 33 based on the instruction concerned, and starts the supply of the electric power from the battery to the brake light unit 33. The brake light unit 33 turns on an LED light source responding to the start of the supply of the electric power.

When the MCU core 21 receives an instruction to turn on a direction indicator from the column switch group 10, the MCU core 21 outputs to the lamp driving switch controller 25 an instruction to flash the direction indicator unit 34. The lamp driving switch controller 25 outputs an instruction to turn on a switch in the direction indicator unit 34, and starts the supply of the electric power from the battery to the direction indicator unit 34. The direction indicator unit 34 flashes an LED light source responding to the start of the supply of the electric power.

When the interior light driving switch controller 26 receives a signal notifying that a door is opened from the door lock unit 35, the interior light driving switch controller 26 outputs to the room light unit 36 an instruction to turn on the room light unit 36. The interior light driving switch controller 26 outputs an instruction to turn on a switch in the room light unit 36, and starts the supply of the electric power from the battery to the room light unit 36. The room light unit 36 turns on an LED light source responding to the start of the supply of the electric power.

Figure 2:
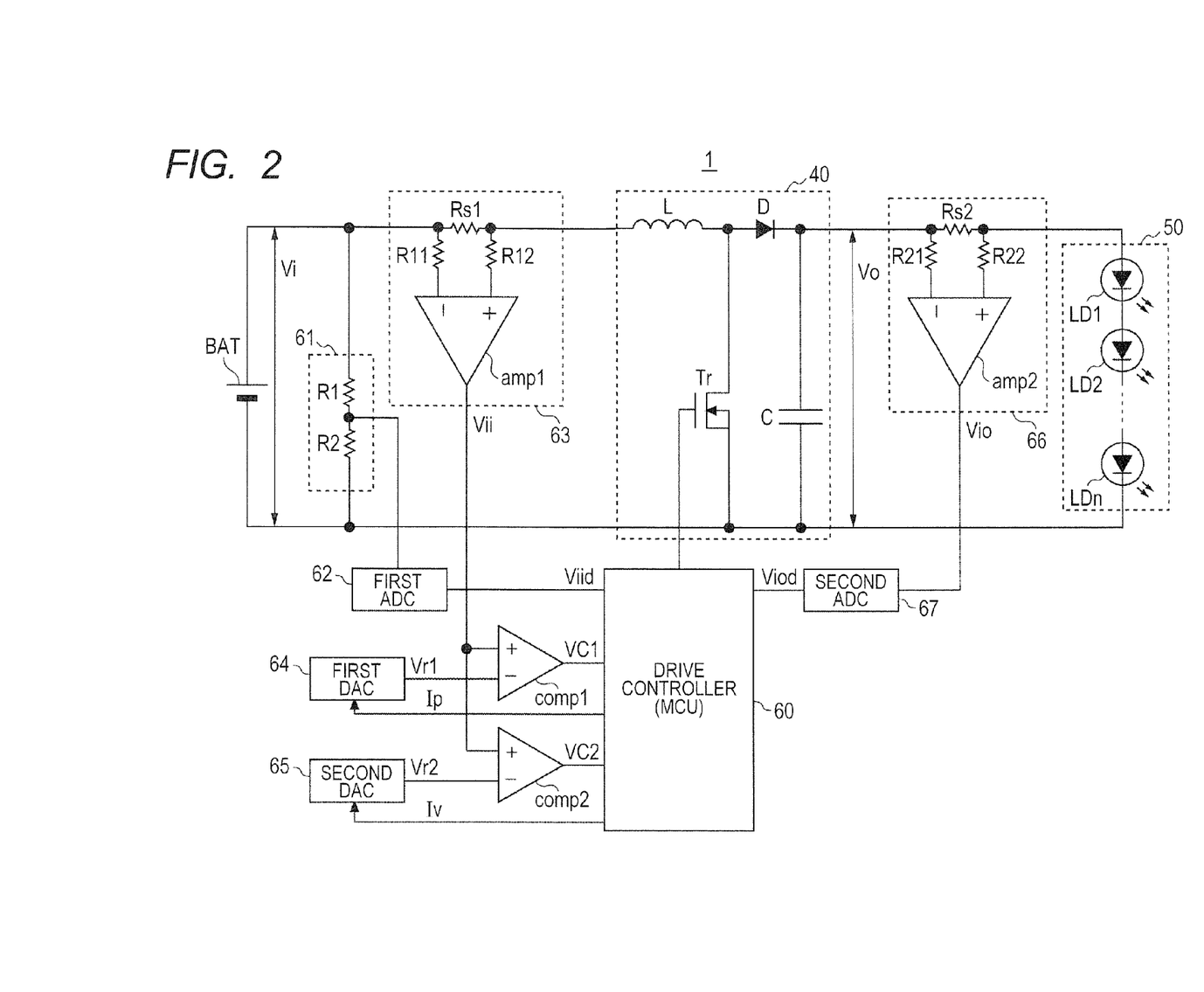
FIG. 2 illustrates a block diagram of the semiconductor device according to Embodiment 1.

The following explanation will be made for the semiconductor device 1 which controls the light source mounted in the headlight unit 30. FIG. 2 illustrates a block diagram of the semiconductor device according to Embodiment 1. In the example illustrated in FIG. 2, a battery BAT is employed as a power supply which supplies an input voltage to the semiconductor device 1. An LED light source 50 illustrated in FIG. 2 is an example of the load driven by the semiconductor device 1. The LED light source 50 is comprised of light emitting diodes LD1-LDn (n is the number of the light emitting diodes) coupled in series. The electric power outputted from the step-up circuit 40 is supplied to both ends of the light emitting diodes LD1-LDn coupled in series.

As illustrated in FIG. 2, the semiconductor device 1 according to Embodiment 1 is comprised of a step-up circuit 40, a drive controller 60, an input voltage detector 61, a first analog-to-digital converter (for example, a first ADC 62), an input current detector 63, a first digital-to-analog converter (for example, a first DAC 64), a second digital-to-analog converter (for example, a second DAC 65), an output current detector 66, and a second analog-to-digital converter (for example, a second ADC 67).

Here, the implementation mode of the semiconductor device 1 according to Embodiment 1 is explained. In the semiconductor device 1, the circuit blocks or elements illustrated in FIG. 2 may be comprised of discrete parts. Alternatively, in the semiconductor device 1, the step-up circuit 40 may be comprised of discrete parts, and the drive controller 60, the input voltage detector 61, the first ADC 62, the input current detector 63, the first DAC 64, the second DAC 65, the output current detector 66, and the second ADC 67 may be formed in one semiconductor package. Even in a case where multiple components are formed in one semiconductor package, it is preferable to implement the resistors illustrated in FIG. 2 as discrete parts.

The step-up circuit 40 steps up an input voltage Vi, and outputs an output voltage Vo. The step-up circuit 40 is comprised of an inductor L, a drive transistor Tr, a diode D, and a smoothing capacitor C. One terminal of the inductor L is coupled to the positive electrode of the battery BAT, and the other terminal is coupled to an anode of the diode D and a drain of the drive transistor Tr. A gate of the drive transistor Tr is supplied with a PWM (Pulse Width Modulation) signal outputted by the drive controller 60 and a source of the drive transistor Tr is coupled to the negative electrode of the battery BAT. A cathode of the diode D is coupled to a high potential side terminal of the LED light source 50 and one terminal of the smoothing capacitor C. The other terminal of the smoothing capacitor C is coupled to the negative electrode of the battery BAT. The step-up circuit 40 outputs the voltage generated across the smoothing capacitor C as the output voltage Vo. The step-up circuit 40 outputs an output current based on the charge stored in the smoothing capacitor C and the current flowing toward the LED light source 50 via the diode D.

The input voltage detector 61 detects a voltage value of the input voltage Vi. The input voltage detector 61 is comprised of resistors R1 and R2. The resistors R1 and R2 are coupled in series between the positive electrode and the negative electrode of the battery BAT. The input voltage detector 61 outputs, as an input voltage detection voltage, a voltage obtained by subdividing the input voltage Vi by a ratio of the values of resistance of the resistors R1 and R2, as a detected voltage of the voltage value of the input voltage Vi.

The first ADC 62 converts the voltage value outputted by the input voltage detector 61 into an input voltage value Viid expressed in a digital value. The first ADC 62 supplies the generated input voltage value Viid to the drive controller 60.

The input current detector 63 detects an input current inputted into the inductor L. The input current detector 63 is comprised of a shunt resistor Rs1, resistors R11 and R12, and a sense amplifier amp1. The shunt resistor Rs1 is inserted in a wiring which couples the positive electrode of the battery BAT to the one end of the inductor L. The shunt resistor Rs1 is a resistor with a small value of resistance compared with the resistors R11 and R12. Across the shunt resistor Rs1, a voltage corresponding to the magnitude of the input current flowing through the inductor L is generated. The resistor R11 is coupled between the one end of the shunt resistor Rs1 and an inverted input terminal of the sense amplifier amp1. The resistor R12 is coupled between the other end of the shunt resistor Rs1 and a non-inverted input terminal of the sense amplifier amp1. The sense amplifier amp1 outputs a voltage obtained by amplifying the voltage generated across the shunt resistor Rs1 at a preset amplification factor, as an input current detection voltage Vii.

The first DAC 64 outputs a first comparison voltage Vr1 having an analog value corresponding to a first drive change setting value (for example, a peak current value Ip) outputted by the drive controller 60. A first comparator comp1 compares a value of the input current with the first drive change setting value indicative of an upper limit of the input current, and outputs the comparison result VC1 concerned. Specifically, the first comparator comp1 compares the input current detection voltage Vii indicative of the magnitude of the input current with the first comparison voltage Vr1 outputted by the first DAC 64. Then, the comparison result VC1 outputted by the first comparator comp1 becomes at a high level during the period when the input current detection voltage Vii exceeds the first comparison voltage Vr1.

The second DAC 65 outputs a second comparison voltage Vr2 having an analog value corresponding to a second drive change setting value (for example, a minimum current value Iv) outputted by the drive controller 60. A second comparator comp2 compares a value of the input current with the second drive change setting value indicative of a lower limit of the input current, and outputs the comparison result VC2 concerned. Specifically, the second comparator comp2 compares the input current detection voltage Vii indicative of the magnitude of the input current with the second comparison voltage Vr2 outputted by the second DAC 65. Then, the comparison result VC2 outputted by the second comparator comp2 becomes at a low level during the period when the input current detection voltage Vii is less than the second comparison voltage Vr2.

The output current detector 66 detects the output current outputted from the step-up circuit 40. The output current detector 66 is comprised of a shunt resistor Rs2, resistors R21 and R22, and a sense amplifier amp2. The shunt resistor Rs2 is inserted in a wiring which couples the output of the step-up circuit 40 to the high potential side terminal of the LED light source 50. The shunt resistor Rs2 is a resistor with a small value of resistance compared with the resistors R21 and R22. Across the shunt resistor Rs2, a voltage corresponding to the magnitude of the output current flowing from the step-up circuit 40 to the LED light source 50 is generated. The resistor R21 is coupled between the one end of the shunt resistor Rs2 and an inverted input terminal of the sense amplifier amp2. The resistor R22 is coupled between the other end of the shunt resistor Rs2 and a non-inverted input terminal of the sense amplifier amp2. The sense amplifier amp2 outputs a voltage obtained by amplifying the voltage generated across the shunt resistor Rs2 at a preset amplification factor, as an output current detection voltage Vio.

The second ADC 67 converts the voltage value outputted by the current detector 66 into an output current detected value Viod expressed in a digital value. The second ADC 67 supplies the generated output current detected value Viod to the drive controller 60.

The drive controller 60 outputs a drive change setting value (for example, a peak current value Ip and a minimum current value Iv), and at the same time, outputs a driving pulse signal (for example, a PWM signal) to drive the drive transistor Tr, according to the output of the first comparator comp1 and the second comparator comp2. Specifically, based on the outputs of the first comparator comp1 and the second comparator comp2, the drive controller 60 sets the drive transistor Tr in a conductive state during the period after the value of the input current becomes less than the lower limit current value Iv until the value of the input current exceeds the peak current value Ip. The drive controller 60 sets the drive transistor Tr in a cut-off state during the period after the value of the input current exceeds the peak current value Ip until the value of the input current becomes less than the minimum current value Iv. In the following explanation, a drive change setting value is employed as a name to express generically the peak current value Ip and the minimum current value Iv.

The drive controller 60 performs the correction process of the drive change setting value to be supplied to the first DAC 64 and the second DAC 65, in addition to the calculation of the drive change setting value. Specifically, the drive controller 60 corrects the drive change setting value to a smaller value when the value of the output current of the step-up circuit 40 is greater than the correction threshold set up in advance with reference to a target output current value set up in advance, and the drive controller corrects the drive change setting value to a larger value when the value of the output current of the step-up circuit 40 is smaller than the correction threshold with reference to the target output current value. In this correction process of the drive change setting value, a correction instruction value calculated by the drive controller 60 by use of the value of the output current and the value of the input voltage Vi is employed.

The drive controller 60 also calculates the drive change setting value and the correction instruction value by use of the value of the output current and the value of the input voltage Vi. In the present case, the drive controller 60 performs the calculation of the drive change setting value and the correction instruction value for every multiple control cycles, assuming that the on-off control of the drive transistor Tr is performed once in one control cycle.

The drive controller 60 performs the correction process of the drive change setting value as follows. When the sign of the calculated correction instruction value is positive, the drive controller 60 adds the amount of correction for one step of the output value of the first DAC 64 and the second DAC 65 to the calculated drive change setting value, and outputs the added result to the first DAC 64 and the second DAC 65. When the sign of the calculated correction instruction value is negative, the drive controller 60 subtract the amount of correction for one step of the output value of the first DAC 64 and the second DAC 65 from the calculated drive change setting value, and outputs the subtracted result to the first DAC 64 and the second DAC 65.

Figure 3:
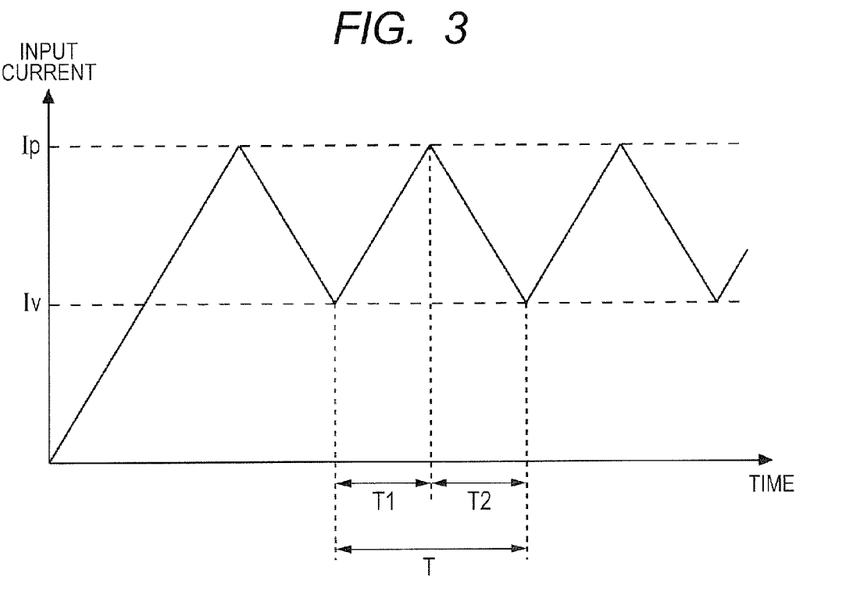
FIG. 3 illustrates a timing chart explaining a change of an input current of the semiconductor device according to Embodiment 1.
Figure 4:
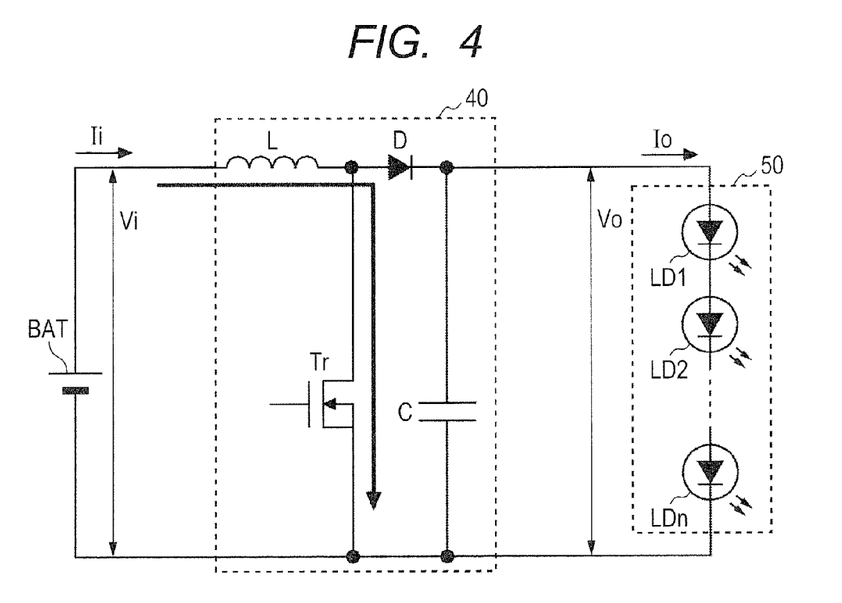
FIG. 4 is an explanatory drawing illustrating the flow of an electric current in a step-up circuit when a drive transistor is in a conductive state.

Here, the drive change setting value and the correction instruction value are explained in detail. FIG. 3 illustrates a timing chart explaining a change of the input current when the semiconductor device 1 according to Embodiment 1 is operated. As illustrated in FIG. 3, in the semiconductor device 1, the input current increases and decreases periodically. This is because the semiconductor device 1 controls on-off of the drive transistor Tr so that the input current increases and decreases between a peak current value Ip and a minimum current value Iv. Specifically, the semiconductor device 1 switches the drive transistor Tr from a cut-off state (OFF state) to a conductive state (ON state), responding to the input current having decreased to a value less than the minimum current value Iv. Accordingly, the input current flows toward the negative electrode of the battery BAT via the inductor L and the drive transistor Tr of the step-up circuit 40. At this time, energy is stored in the inductor L by the action of the input current. Then, the semiconductor device 1 switches the drive transistor Tr from the conductive state to the cut-off state, responding to the input current having increased to a value exceeding the peak current value Ip. The period when the drive transistor Tr is in the conductive state is expressed by a period T1 in FIG. 3. FIG. 4 is an explanatory drawing illustrating the flow of the electric current in the step-up circuit 40 in the period T1.

Figure 5:
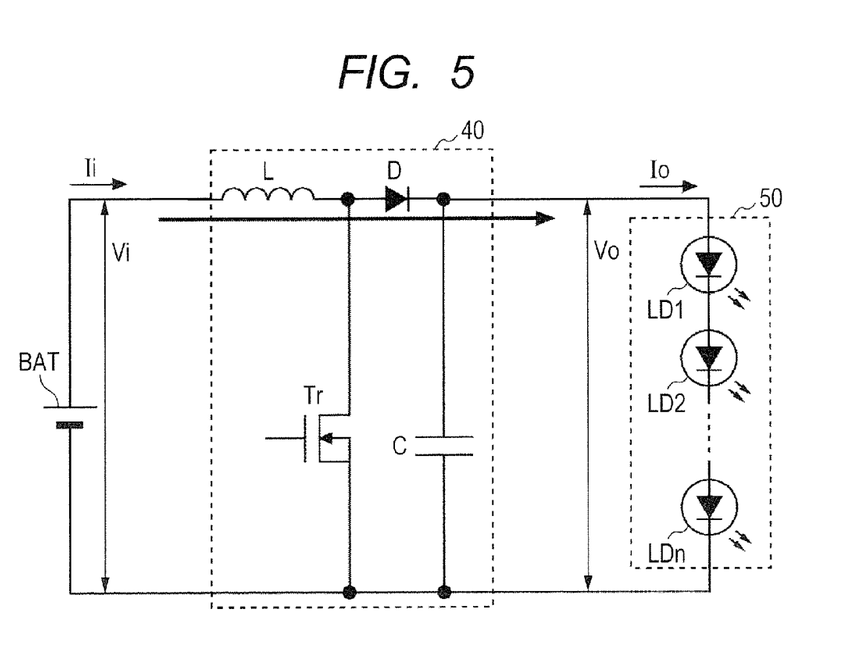
FIG. 5 is an explanatory drawing illustrating the flow of an electric current in the step-up circuit when the drive transistor is in a cut-off state.

During the period when the drive transistor Tr is in the cut-off state, the input current flows toward the smoothing capacitor C via the inductor L and the diode D of the step-up circuit 40. At this time, the energy stored in the inductor L by the action of the input current is supplied to the smoothing capacitor C. Accordingly, the output voltage of the step-up circuit 40 rises. Then, the semiconductor device 1 switches the drive transistor Tr from the cut-off state to the conductive state, responding to the input current having decreased to a value less than the minimum current value Iv. The period when the drive transistor Tr is in the cut-off state is expressed by a period T2 in FIG. 3. FIG. 5 is an explanatory drawing illustrating the flow of an electric current in the step-up circuit 40 in the period T2.

In the semiconductor device 1 according to Embodiment 1, the on-off control of the drive transistor Tr is performed once through the period T1 and the period T2. In the semiconductor device 1 according to Embodiment 1, the cycle in which the on-off control of the drive transistor Tr is performed once in this way is defined as one control cycle. In FIG. 3, the period when one control cycle is performed is expressed as a period T.

As described above, in the semiconductor device 1 according to Embodiment 1, the drive transistor Tr is controlled by comparing the magnitude of the input current Ii with the peak current value Ip and the minimum current value Iv. That is, when the on-off control of the drive transistor Tr is performed in the semiconductor device 1, the drive controller 60 only generates a PWM signal based on the output of the first comparator comp1 and the second comparator comp2, and the drive controller 60 does not perform complicated calculation for generating the PWM signal. On the other hand, in the semiconductor device 1, the drive controller 60 calculates the peak current value Ip and the minimum current value Iv based on the output current value Ip and the input voltage Vi. At this time, in the semiconductor device 1, the drive controller 60 calculates the peak current value Ip and the minimum current value Iv for every multiple control cycles, without calculating the peak current value Ip and the minimum current value Iv for every one control cycle. Consequently, the amount of calculation in the drive controller 60 is reduced.

In the semiconductor device 1 according to Embodiment 1, by taking into consideration the output current value Ip and the input voltage Vi when calculating the peak current value Ip and the minimum current value Iv, it is possible to minimize the deviation of the output current resulting from variations in the elements included in the step-up circuit 40, fluctuations of temperature, and variations of the input voltage Vi. Accordingly, the peak current value Ip and the minimum current value Iv which are employed in the semiconductor device 1 according to Embodiment 1 are explained in detail in the following.

First, in the step-up circuit 40, the current change in the period T1 in which the drive transistor Tr is controlled to be in the conductive state is expressed by Equation (1).

[Mathematical 1]

$$Vi = L\frac{di}{dt} \quad (1)$$

On the other hand, in the step-up circuit 40, the current change in the period T2 in which the drive transistor Tr is controlled to be in the cut-off state is expressed by Equation (2).

[Mathematical 2]

$$Vi - L\frac{di}{dt} = Vo \quad (2)$$

Figure 6:
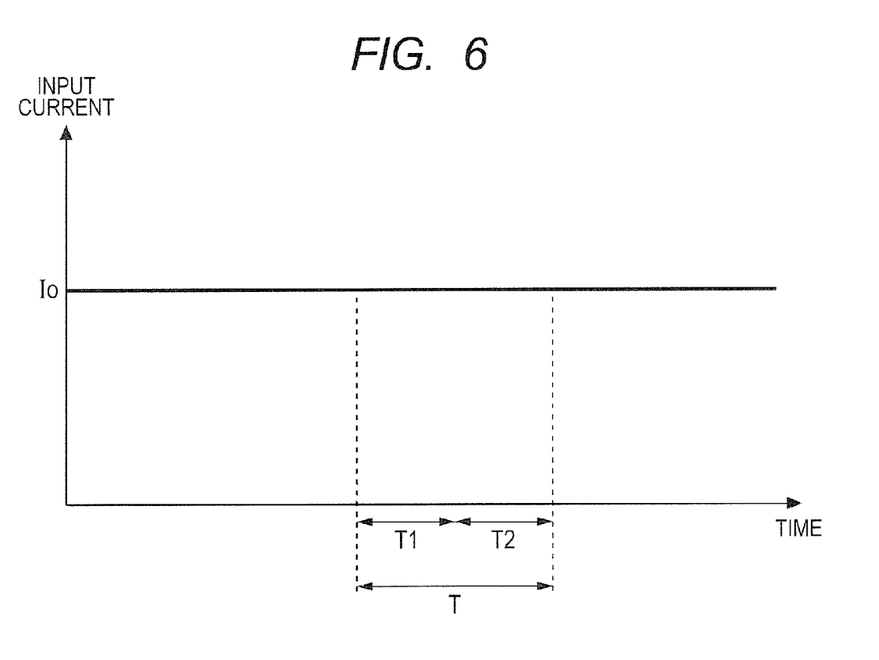
FIG. 6 illustrates a timing chart explaining a change of an output current of the step-up circuit.

In the step-up circuit 40, the output current Io during the period T is fed based on the charge stored in the smoothing capacitor C in the period T2. FIG. 6 illustrates a timing chart explaining a change of the output current in the step-up circuit 40. As illustrated in FIG. 6, in the semiconductor device 1 according to Embodiment 1, the step-up circuit 40 supplies the electric power to the LED light source 50 with little time change of the consumption current under the condition of a constant voltage. Accordingly, the output current Io is fed in the state stabilized timewise. The relation between this output current To and the charge stored in the smoothing capacitor C is expressed by Equation (3).

[Mathematical 3]

$$\frac{(Ip + Iv)T2}{2} = IoT \quad (3)$$

When the peak current value Ip and the minimum current value Iv are derived using Equation (1)-Equation (3), Equation (4) and Equation (5) can be obtained.

[Mathematical 4]

$$Ip = \frac{Vo}{Vi}Io + \frac{1}{2L}\frac{Vi}{Vo}(Vo - Vi)T \quad (4)$$

[Mathematical 5]

$$Iv = \frac{Vo}{Vi}Io + \frac{1}{2L}\frac{Vi}{Vo}(Vo - Vi)T \quad (5)$$

In the semiconductor device 1 according to Embodiment 1, the drive controller 60 calculates the peak current value Ip obtained with the use of Equation (4) and the minimum current value Iv obtained with the use of Equation (5). At this time, the peak current value Ip and the minimum current value Iv both have a term which includes the output current Io. Accordingly, in the semiconductor device 1, even if the drive transistor Tr is controlled based on the change of the input current Ii, the drive transistor Tr is controlled at the timing when the magnitude of the output current Io is reflected. Accordingly, the deviation of the output current resulting from variations in the elements included in the step-up circuit 40 is minimized.

In the drive controller 60, Vo, Vi, L, Io, and T are employed as parameters in the calculation using Equation (4) and Equation (5). In the drive controller 60, as the input voltage Vi and the output current Io among these parameters, the measurement values acquired at the calculation timing are employed, and fixed values are employed as the output voltage Vo, the inductance of the inductor L, and the length of one control cycle T. This is because the inductance of the inductor L is decided by the selection of the component and the LED light source 50 is a load of the stabilized power consumption; accordingly, there is no problem even if the fixed values are used as the output voltage Vo, the inductance of the inductor L, and the length of one control cycle T. The deviation of the parameter due to the use of the fixed value in the actual circuit is reflected in the measurement value of the output current Io. Accordingly, the deviation of the output current Io from the target output current value is minimized by employing the measurement value of the output current Io in the calculation.

Figure 7:
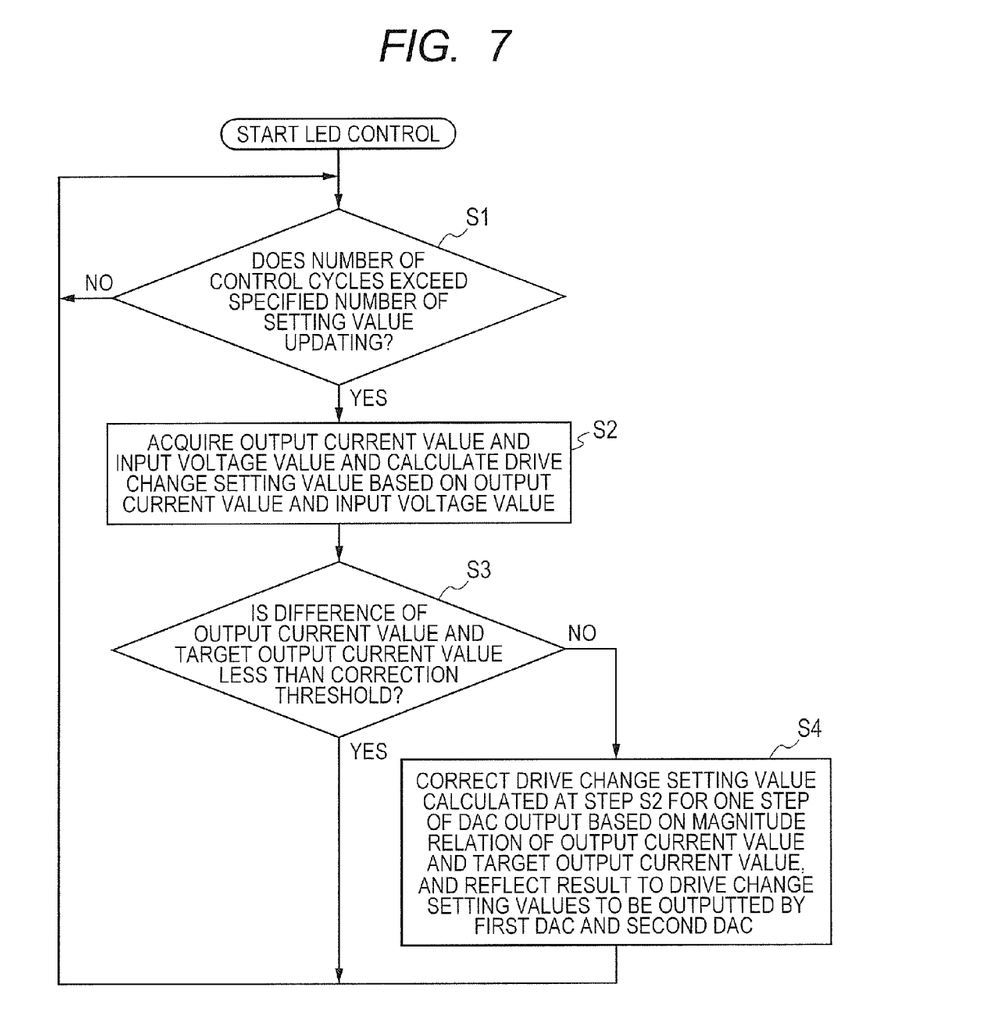
FIG. 7 illustrates a flow chart explaining the calculation procedure of a drive change setting value of the semiconductor device according to Embodiment 1.

Next, the calculation procedure of the drive change setting value in the semiconductor device 1 according to Embodiment 1 is explained. FIG. 7 illustrates a flow chart explaining the calculation procedure of the drive change setting value of the semiconductor device 1 according to Embodiment 1.

As illustrated in FIG. 7, in the semiconductor device 1 according to Embodiment 1, at the start of the control of the LED light source, generation of the step-up voltage by the step-up circuit 40 is first started, based on the initial value of the drive change setting value. Then, the drive change setting value is maintained until the number of control cycles performed exceeds a specified number of setting value updating. Then, responding to the number of control cycles performed having exceeded the specified number of setting value updating, the updating of the drive change setting value is performed (Step S1). That is, in the semiconductor device 1 according to Embodiment 1, the setting value updating cycle to update the drive change setting value includes multiple control cycles.

When the setting value updating cycle is started based on the determination at Step S1, the semiconductor device 1 according to Embodiment 1 performs the process at the following Step S2. At Step S2, the output current value Io and the input voltage value Vi are acquired first. Specifically, the drive controller 60 acquires, from the first ADC 62, the input voltage detected value Viid corresponding to the input voltage Vi at the start time of the setting value updating cycle, and at the same time, the drive controller 60 acquires, from the second ADC 67, the output current detected value Viod corresponding to the output current value Io at the start time of the setting value updating cycle. The input voltage detected value Viid is a value obtained by subdividing the input voltage Vi by the resistors R1 and R2 and is different from the actual input voltage Vi. However, the subdivision ratio is known, therefore, the drive controller 60 calculates the actual input voltage Vi from the input voltage detected value Viid based on the known subdivision ratio. The output current detected value Viod is a value obtained by amplifying the magnitude of the output current Io by the sense amplifier amp2 and is different from the actual output current value Io. However, the amplification factor is known, therefore, the drive controller 60 calculates the actual output current value Io from the output current detected value Viod based on the known amplification factor. Then, the drive controller 60 calculates the drive change setting value by applying the input voltage value Vi obtained and the output current value Io obtained, into Equation (4) and Equation (5).

Next, the semiconductor device 1 according to Embodiment 1 performs the process at Step S3. At Step S3, it is determined whether the difference of the output current value Io acquired at Step S2 and the target output current value set in advance is less than the correction threshold. In the determination at Step S3, the correction threshold and the absolute value of the difference between the output current value Io and the target output current value set in advance are compared. The correction threshold is a value which can be arbitrarily determined according to the specification of the semiconductor device 1. However, in Embodiment 1, the correction threshold is assumed to be the magnitude for one step of the output step of the first DAC 64 and the second DAC 65.

At Step S3, when it is determined that the absolute value of the difference between the output current value Io and the target output current value set in advance is smaller than the correction threshold (the branch of YES at Step S3), the drive controller 60 performs the standby process at Step S1 again, without changing the drive change setting value set at present. This is because the desired output current value is obtained with the drive change setting value set at present.

On the other hand, at Step S3, when it is determined that the absolute value of the difference between the output current value Io and the target output current value set in advance is greater than the correction threshold (the branch of NO at Step S3), the drive controller 60 performs the process at Step S4. At Step S4, the drive change setting value calculated at Step S2 is corrected for one step of the output step of the first DAC 64 and the second DAC 65, based on the magnitude relation of the output current value and the target output current value. Then, the drive controller 60 reflects the corrected drive change setting value on the drive change setting value outputted by the first DAC 64 and the second DAC 65. Specifically, when the output current value is smaller than the target output current value, the drive controller 60 according to Embodiment 1 generates the corrected drive change setting value by adding the amount of correction for one step of the output step of the DAC to the drive change setting value calculated at Step S2. When the output current value is greater than the target output current value, the drive controller 60 according to Embodiment 1 generates the corrected drive change setting value by subtracting the amount of correction for one step of the output step of the DAC from the drive change setting value calculated at Step S2. After the process at Step S4 is completed, the standby process at Step S1 is performed again.

As explained above, in the semiconductor device 1 according to Embodiment 1, by generating the PWM signal to drive the drive transistor Tr based on the magnitude of the input current Ii, it is possible to perform the on-off control of the drive transistor Tr, without performing complicated calculations which are necessary in performing the on-off control of the drive transistor Tr based on the feedback value of the output voltage Vo or the output current Io. According to this configuration, in the semiconductor device 1 according to Embodiment 1, it is possible to increase the switching frequency of the drive transistor Tr even if an arithmetic unit with low computing power is employed. In the semiconductor device 1 according to Embodiment 1, it is possible to increase the stability of the output current Io and the output voltage Vo, by increasing the switching frequency.

For example, in order to perform a stable power supply to the LED light source 50, the switching frequency higher than a definite frequency (for example, 300 kHz or higher) is required. However, in an arithmetic unit with low computing power, there is a problem that it is difficult to generate a PWM signal higher than the definite frequency required from the output current Io or the output voltage Vo of the step-up circuit 40. However, in the semiconductor device 1 according to Embodiment 1, the PWM signal is generated based on the comparison result of the first comparator comp1 and the second comparator comp2; therefore, the computing power of the drive controller 60 is not required. That is, in the semiconductor device 1 according to Embodiment 1, it is possible to generate a high-frequency PWM signal, irrespective of the computing power of the drive controller 60.

In the semiconductor device 1 according to Embodiment 1, when calculating the peak current value Ip and the minimum current value Iv which are employed for comparison of the magnitude of the input current Ii, consideration is given to the input voltage Vi and the output current Io with a large variation due to variations of the elements, etc. Accordingly, in the semiconductor device 1 according to Embodiment 1, it is possible to minimize the error which occurs due to variations of the elements, etc.

In the semiconductor device 1 according to Embodiment 1, the calculation of the peak current value Ip and the minimum current value Iv, which requires high computing power, is performed once in multiple control cycles. Accordingly, the semiconductor device 1 according to Embodiment 1 can calculate the peak current value Ip and the minimum current value Iv at the speed which does not affect the operation of the semiconductor device 1, even if an arithmetic unit of low computing power is employed as the drive controller 60.

In the semiconductor device 1 according to Embodiment 1, a fixed value is employed for a calculation parameter with small variations among the calculation parameters of the peak current value Ip, the minimum current value Iv, and the correction instruction value. Accordingly, in the semiconductor device 1 according to Embodiment 1, it is possible to reduce the amount of calculation of the drive controller 60 and the accompanying circuits. That is, the semiconductor device 1 according to Embodiment 1 is suitable for the drive of a load with a small voltage fluctuation such as the LED light source 50.

Embodiment 2

Figure 8:
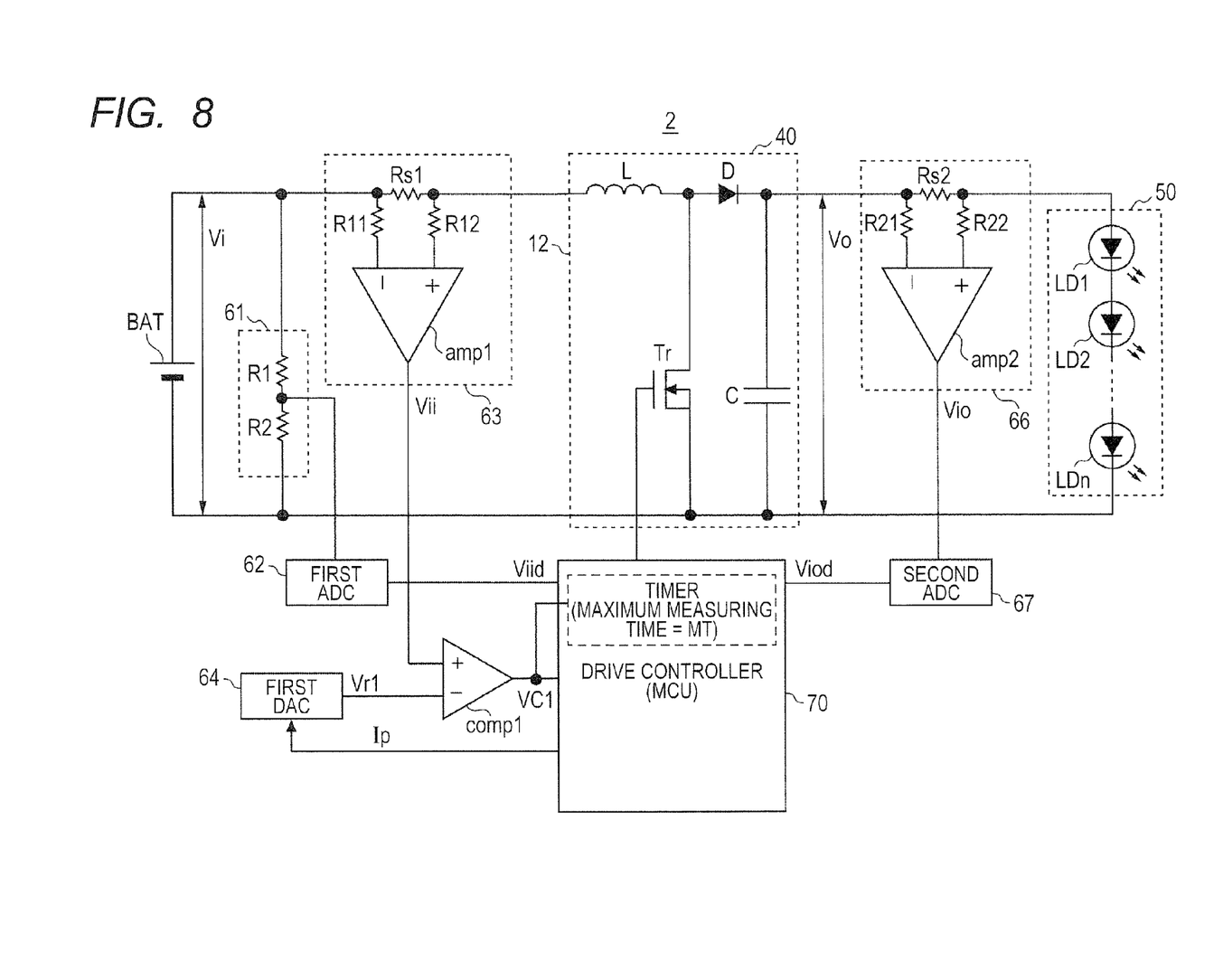
FIG. 8 illustrates a block diagram of a semiconductor device according to Embodiment 2.

Embodiment 2 explains a semiconductor device 2 used as another mode of the semiconductor device 1 according to Embodiment 1. FIG. 8 illustrates a block diagram of the semiconductor device 2 according to Embodiment 2. In the explanation of the semiconductor device 2 according to Embodiment 2, the same symbol as in Embodiment 1 is attached to the same component as in Embodiment 1, and the repeated explanation thereof is omitted.

As illustrated in FIG. 8, the semiconductor device 2 according to Embodiment 2 is equivalent to the semiconductor device 1 according to Embodiment 1 in which the second comparator comp2 and the second DAC 65 are deleted and the drive controller 60 is replaced with a drive controller 70. The drive controller 70 includes a timer which measures a definite period of time. Responding to the fact that the comparison result VC1 inputted from the first comparator comp1 indicates that the input current Ii has become greater than the upper limit (for example, the peak current value Ip), the drive controller 70 starts the measurement of the elapsed time with the timer and switches the drive transistor Tr from a conductive state to a cut-off state. Responding to the fact that the elapsed time measured with the timer has reached a maximum elapsed time MT, the drive controller 70 switches the drive transistor from the cut-off state to the conductive state.

That is, in the semiconductor device 2 according to Embodiment 2, decrease of the input current Ii is determined by the timer, without employing the minimum current value Iv. Since the LED light source 50 driven by the step-up circuit 40 has stable power consumption, it is possible to predict the decrease of the output voltage Vo due to the consumption of the output current. Therefore, even if the time of the decrease of the input current Ii is measured by the timer as in the drive controller 70, there is no large change of the output voltage Vo.

As explained above, in the semiconductor device 2 according to Embodiment 2, by not employing the second comparator comp2 and the second DAC 65, it is possible to reduce the number of the circuit elements compared with the semiconductor device 1 according to Embodiment 1. The timer function is mounted in an MCU (Micro Controller Unit) employed as the drive controller 70 in many cases; accordingly, the employment of the timer of the drive controller 70 does not result in the addition of a new circuit.

Embodiment 3

Embodiment 3 explains another example of the calculation method of the drive change setting value in the drive controller 60 according to Embodiment 1. In the calculation method of the drive change setting value according to Embodiment 3, in the determination processing at Step S3 illustrated in FIG. 7, the processing after the determination that the difference of the measured output current Io and the target output current value is greater than the correction threshold (a branch of NO at Step S3) is different from the processing in Embodiment 1. Accordingly, in the explanation of the calculation method of the drive change setting value according to Embodiment 3, only the procedure when it is determined as NO at Step S3 illustrated in FIG. 7 is explained.

In the calculation method of the drive change setting value according to Embodiment 3, when the output current Io deviates from the target output current value as an ideal value, the drive change setting value is corrected using a correction instruction value. Therefore, this correction instruction value is explained in detail in the following.

Figure 9:
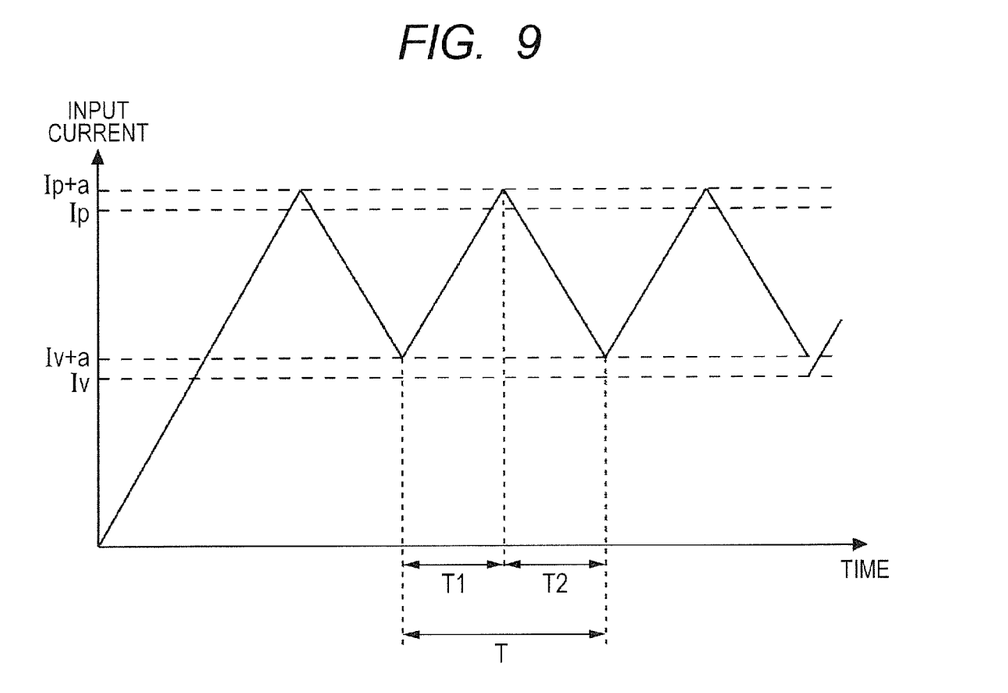
FIG. 9 illustrates a timing chart explaining a change of an input current when the correction of a drive change setting value is performed in a semiconductor device according to Embodiment 3.

First, FIG. 9 illustrates a timing chart explaining a change of an input current when correction of a drive change setting value is performed in a semiconductor device according to Embodiment 3. In the example illustrated in FIG. 9, the drive change setting value is corrected with a correction value "a" which corresponds to the magnitude of the correction instruction value. As illustrated in FIG. 9, by correcting the drive change setting value with the correction value "a", the charge stored in the smoothing capacitor C at the period T2 increases by aT2. Equation (6) expresses the relation between the output current To and the charge stored in the smoothing capacitor C when this correction value "a" is applied.

[Mathematical 6]

$$\frac{(Ip+Iv)T2}{2} + aT2 = IoT \quad (6)$$

Here, Equation (7) and Equation (8) can be derived from Equation (1), Equation (2), and Equation (6).

[Mathematical 7]

$$Ip = \frac{Vo}{Vi}Io + \frac{1}{2L}\frac{Vi}{Vo}(Vo-Vi)T - a \quad (7)$$

[Mathematical 8]

$$Io = \frac{Vo}{Vi}\left\{Ip - \frac{1}{2L}\frac{Vi}{Vo}(Vo-Vi)T\right\} + \frac{Vi}{Vo}a \quad (8)$$

By comparing the output currents before and after the drive change setting value is corrected with the correction value "a", the relations expressed by Equation (9) and Equation (10) can be obtained. Here, Io_new in Equation (9) and Equation (10) is the target output current value set up in advance, and Io_old is a measured value of the output current acquired by the output current detector 66 and the second ADC 67. Equation (9) and Equation (10) express the relation for bringing the output current value close to the target output current value.

[Mathematical 9]

$$\text{Io\_new} = \text{Io\_old} + \frac{Vi}{Vo}a \quad (9)$$

[Mathematical 10]

$$a = \frac{Vi}{Vo}(\text{Io\_new} - \text{Io\_old}) \quad (10)$$

When it is assumed that the term in the parentheses in Equation (10) is an electric current correction amount ΔI indicative of the magnitude of the output current to be changed, Equation (10) can be expressed by Equation (11). Note that when the output current value Io is smaller than the target output current value, the amount of correction "a" becomes positive, and when the output current value Io is greater than the target output current value, the amount of correction "a" becomes negative.

[Mathematical 11]

$$a = \frac{Vi}{Vo}\Delta I \quad (11)$$

The drive controller 60 according to Embodiment 3 calculates "a" given by Equation (11) as the correction instruction value. Then, the drive controller 60 corrects the drive change setting value by adding the amount of correction based on the calculated correction value "a" to the drive change setting value, and outputs the drive change setting value after the correction to the first DAC 64 and the second DAC 65.

Figure 10:
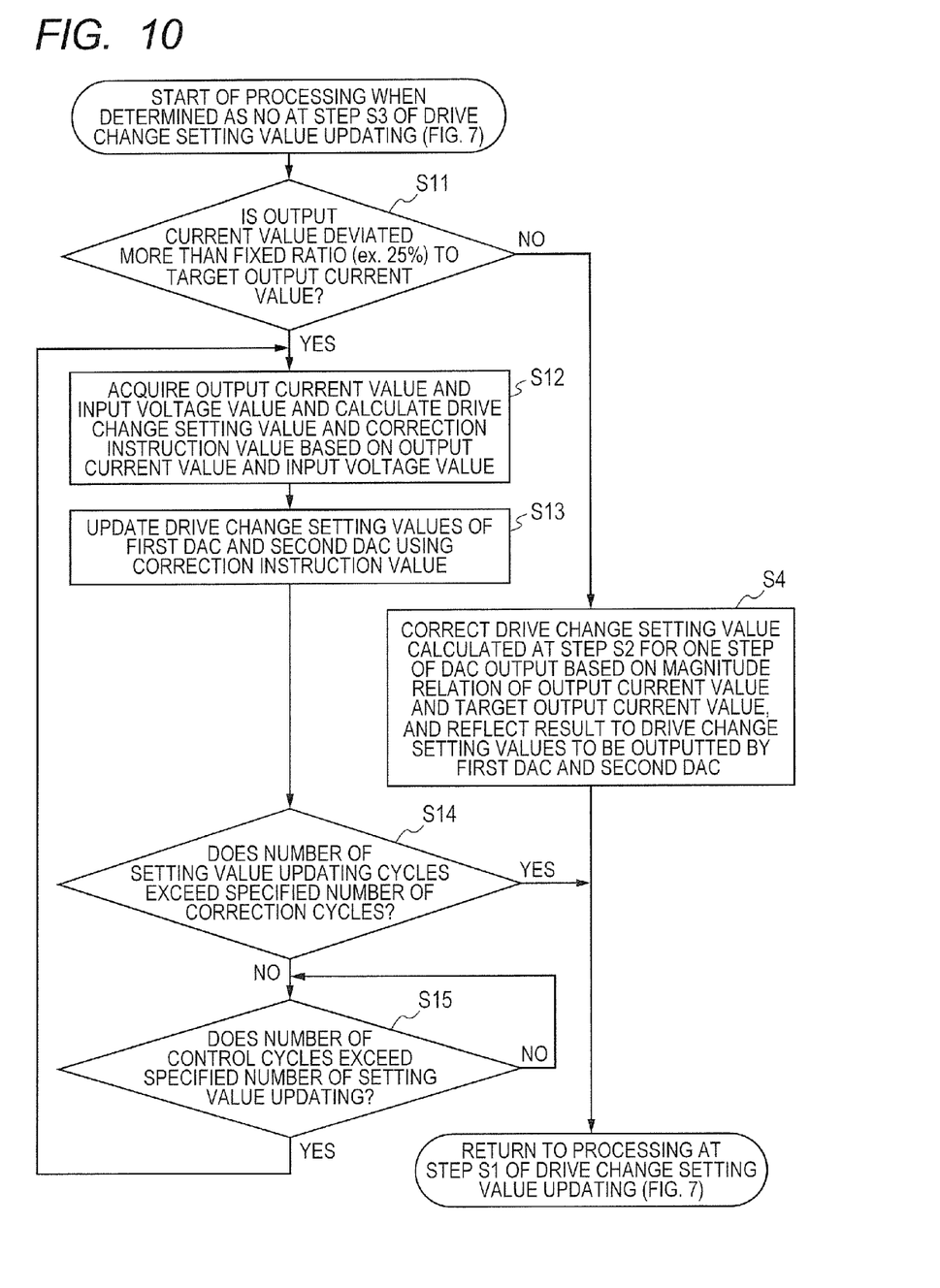
FIG. 10 illustrates a flow chart explaining the calculation procedure of a drive change setting value of the semiconductor device according to Embodiment 3.

FIG. 10 illustrates a flowchart explaining the calculation procedure of the drive change setting value of the semiconductor device according to Embodiment 3. As illustrated in FIG. 10, the calculation procedure of the drive change setting value in the semiconductor device according to Embodiment 3 has the processing at Steps S11-S15 in addition to the processing at Step S4.

The processing at Step S11 is started when it is determined as NO at Step S3. At Step S11, it is determined whether the output current value Io deviates more than the fixed rate (for example, 25%) with reference to the target output current value. When it is determined in this processing at Step S11 that the output current value Io deviates less than 25% with reference to the target output current value, the processing at Step S4 is performed, as is the case with Embodiment 1. On the other hand, when it is determined in the processing at Step S11 that the output current value Io deviates 25% or more with reference to the target output current value, the drive controller 60 performs the processing at Steps S12-S15 in Embodiment 3.

At Step S12, the calculation of the correction instruction value is performed in addition to the calculation of the drive change setting value at Step S2. Subsequently, in the processing at Step S13, the drive controller 60 corrects the drive change setting value outputted by the first DAC 64 and the second DAC 65 by the amount of correction corresponding to the correction instruction value, and supplies the drive change setting value after the correction to the first DAC 64 and the second DAC 65. The details of the correcting method of the drive change setting value at Step S13 are described later.

Subsequently, at Step S14, it is determined whether the count of performing the setting value updating cycle exceeds a specified correction cycle number. When it is determined at Step S14 that the count of performing the setting value updating cycle exceeds the specified correction cycle number, the drive controller 60 performs the standby process at Step S1. On the other hand, at Step S14, when it is determined that the count of performing the setting value updating cycle does not exceed the specified correction cycle number, the drive controller 60 performs the processing at Step S15. The processing at Step S15 corresponds to the processing at Step S1. Then, responding to the completion of the processing at Step S15, the drive controller 60 performs the processing at Step S12.

Figure 11:
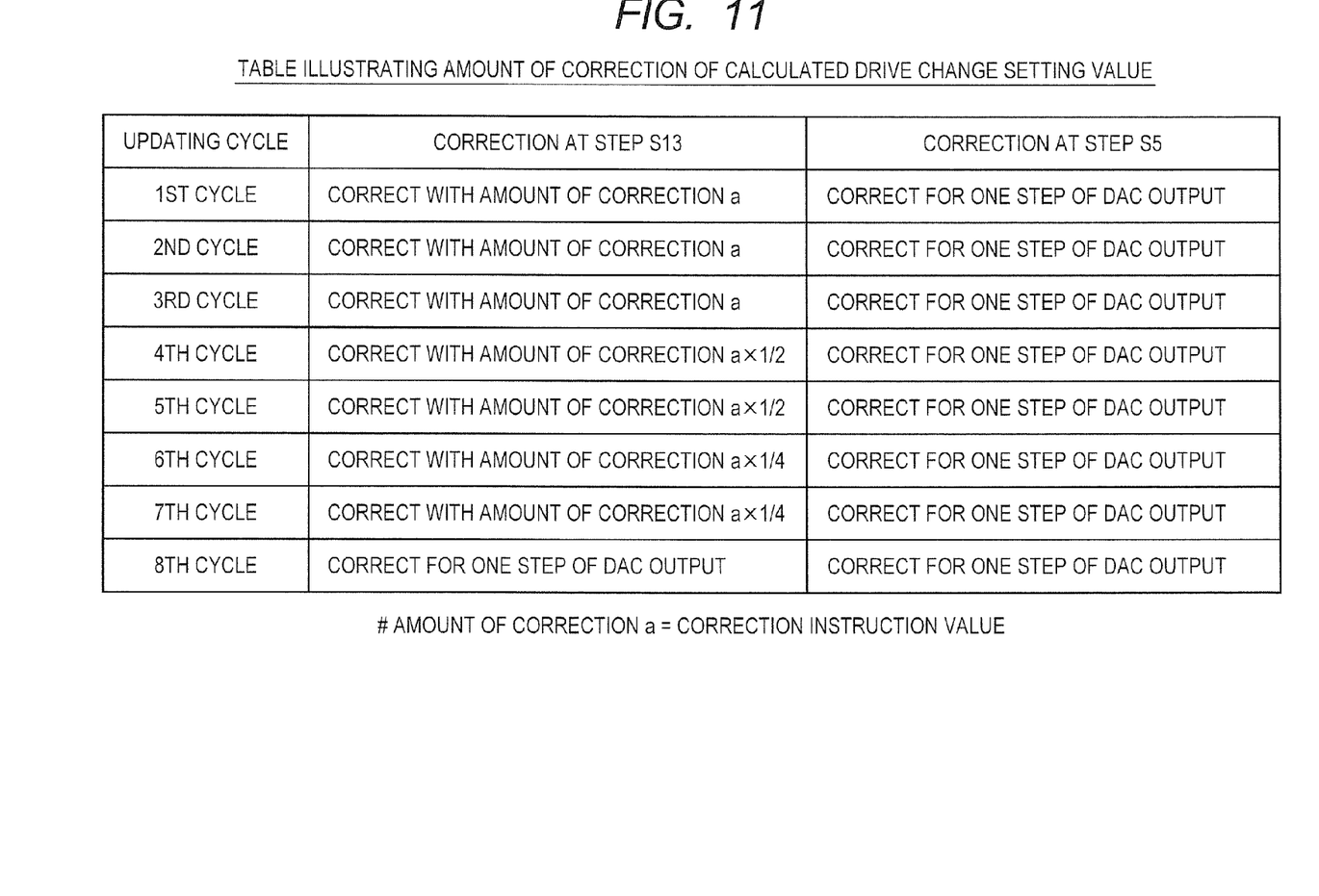
FIG. 11 is an explanatory table illustrating the amount of correction when the correction of a drive change setting value is performed in the semiconductor device according to Embodiment 3.

That is, in Embodiment 3, when it is determined that the output current deviates 25% or more with reference to the target output current value, the updating of the drive change setting value at Step S13 is performed continuously over multiple times. Therefore, updating of the drive change setting value in Step S13 is explained in detail. FIG. 11 is an explanatory table illustrating the amount of correction when correction of the drive change setting value is performed.

As illustrated in FIG. 11, the drive controller 60 according to Embodiment 3 employs a value calculated as the correction instruction value as the amount of correction. Then, the drive controller 60 according to Embodiment 3 performs, continuously over multiple times, the correction value reflection processing (for example, the setting value updating cycle) in which the calculated drive change setting value is added with the correction value calculated based on the correction instruction value and outputted to the digital-to-analog converter. At this time, in the setting value updating cycle of multiple times, the drive controller 60 according to Embodiment 3 decreases the magnitude of the correction value as the count of performing the setting value updating cycle increases.

As explained above, in the calculation method of the drive change setting value according to Embodiment 3, when the output current Io greatly deviates with reference to the target output current value, the drive change setting value is corrected with a larger amount of correction than at Step S4. Accordingly, in the calculation method of the drive change setting value according to Embodiment 3, the deviation of the output current To can be minimized more quickly than in the other embodiments.

In the calculation method of the drive change setting value according to Embodiment 3, the amount of correction to be added to the drive change setting value is made smaller as the setting value updating cycle increases. Accordingly, it is possible to prevent the change of the output current Io from resonating under the influence of periodic noises with the same cycle as the update cycle of the drive change setting value and vibrating greatly even though the correction is performed.

As described above, the invention accomplished by the present inventors has been concretely explained based on the embodiments. However, it cannot be overemphasized that the present invention is not restricted to the embodiments as described above, and it can be changed variously in the range which does not deviate from the gist.

What is claimed is:

1. A semiconductor device comprising:
   a step-up circuit which comprises an inductor and a drive transistor to drive the inductor and generates from an input voltage an output voltage having another voltage value;
   an input current detector which detects an input current inputted into the inductor;
   an output current detector which detects an output current outputted from the step-up circuit;
   a comparator which compares a value of the input current detected by the input current detector with a threshold set up based on a drive change setting value; and
   a drive controller which outputs the drive change setting value and a driving pulse signal to drive the drive transistor according to an output of the comparator,
   wherein the drive controller corrects the drive change setting value to a smaller value when a value of the output current is greater than a correction threshold set up in advance with reference to a target output current value set up in advance, and the drive controller corrects the drive change setting value to a larger value when the value of the output current is smaller than the correction threshold with reference to the target output current value.

2. The semiconductor device according to claim 1,
   wherein the drive controller performs calculation of the drive change setting value by use of a value of the output current and a value of the input voltage, for every plurality of control cycles when the on-off control of the drive transistor is assumed to be performed once in one control cycle.

3. The semiconductor device according to claim 2,
   wherein the drive controller performs calculation of the correction instruction value to the drive change setting value calculated by use of a value of the output current and a value of the input voltage, in addition to the calculation of the drive change setting value.

4. The semiconductor device according to claim 3 further comprising:
   a digital-to-analog converter which outputs the threshold to the comparator based on the drive change setting value,
   wherein when the sign of the correction instruction value is positive, the drive controller adds the amount of correction for one step of the output value of the digital-to-analog converter to the calculated drive change setting value and outputs the added result to the digital-to-analog converter, and
   wherein when the sign of the correction instruction value is negative, the drive controller subtracts the amount of correction for one step of the output value of the digital-to-analog converter from the calculated drive change setting value and outputs the subtracted result to the digital-to-analog converter.

5. The semiconductor device according to claim 4,
   wherein when the difference of the value of the output current and the target output current value is greater than a rate set up in advance, the drive controller performs consecutively multiple times correction value reflection processing in which the calculated drive change setting value is added with the correction value calculated based on the correction instruction value and outputted to the digital-to-analog converter, and wherein, in the correction value reflection processing performed multiple times, the magnitude of the correction value is made smaller as the count of performing the correction value reflection processing increases.

6. The semiconductor device according to claim 3,
wherein the drive controller calculates the drive change setting value and the correction instruction value by use of a formula determined in advance, with the input voltage and the output current as variables.

7. The semiconductor device according to claim 1,
wherein the comparator comprises:
a first comparator which compares a value of the input current with a first drive change setting value indicative of an upper limit of the input current, and outputs the comparison result concerned; and
a second comparator which compares a value of the input current with a second drive change setting value indicative of a lower limit of the input current, and outputs the comparison result concerned, and
wherein, based on the output of the first comparator and the second comparator, the drive controller sets the drive transistor in a conductive state for a period after the value of the input current becomes less than the second drive change setting value until it becomes greater than the first drive change setting value, and the drive controller sets the drive transistor in a cut-off state for a period after the value of the input current becomes greater than the first drive change setting value until it becomes less than the second drive change setting value.

8. The semiconductor device according to claim 1,
wherein the drive change setting value inputted into the comparator indicates the upper limit of the input current, and the comparator compares the drive change setting value with the value of the input current and outputs the comparison result concerned, wherein the drive controller comprises a timer which measures a definite period of time, wherein, responding to the fact that the comparison result inputted from the comparator indicates that the input current has become greater than the upper limit, the drive controller starts the measurement of the elapsed time by means of the timer, and switches the drive transistor from a conductive state to a cut-off state, and wherein, responding to the fact that the elapsed time measured by the timer has reached a maximum elapsed time, the drive controller switches the drive transistor from the cut-off state to the conductive state.

9. The semiconductor device according to claim 1,
wherein the step-up circuit outputs the output voltage as a power supply of an LED light source.

10. A semiconductor device to control a step-up circuit which comprises an inductor and a drive transistor to drive the inductor and generates from an input voltage an output voltage having another voltage value, the semiconductor device comprising:
an input current detector which detects an input current inputted into the inductor;
an output current detector which detects an output current outputted from the inductor;
a comparator which compares a value of the input current detected by the input current detector with a threshold set up based on a drive change setting value; and
a drive controller which outputs the drive change setting value and a driving pulse signal to drive the drive transistor according to an output of the comparator,
wherein the drive controller corrects the drive change setting value to a smaller value when a value of the output current is greater than a correction threshold set up in advance with reference to a target output current value set up in advance, and the drive controller corrects the drive change setting value to a larger value when the value of the output current is smaller than the correction threshold with reference to the target output current value.

* * * * *